(No Model.)

W. H. McDONALD.
FILTERING FAUCET.

No. 379,801. Patented Mar. 20, 1888.

William H. McDonald.

WITNESSES
G. S. Elliott,
E. W. Johnson

INVENTOR

Attorney

UNITED STATES PATENT OFFICE.

WILLIAM H. McDONALD, OF WASHINGTON, DISTRICT OF COLUMBIA.

FILTERING-FAUCET.

SPECIFICATION forming part of Letters Patent No. 379,801, dated March 20, 1888.

Application filed June 4, 1887. Serial No. 240,292. (No model.)

*To all whom it may concern:*

Be it known that I, WILLIAM H. McDONALD, a citizen of the United States of America, residing at Washington, in the District of Columbia, have invented certain new and useful Improvements in Filtering-Faucets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in that class of filtering-faucets which have a filtering-chamber located in the faucet-plug, which faucet-plug is adapted to be filled with any suitable filtering material, as silex, through which the water will have to pass before it is discharged, so that the water will be filtered and substances foreign to pure water will be retained by the filtering material, this invention being an improvement upon my patent dated September 7, 1880, No. 231,923.

The object of my present invention is to provide a cheap, simple, and effective means and construction of the parts whereby the faucet can only be turned in one direction, so that the impurities will be washed from the filtering medium as soon as the faucet is turned.

My present invention consists in the special construction of the faucet-plug to which the handle is attached, so that said faucet-plug can only be turned or rotated in one direction by the handle.

Figure 1:
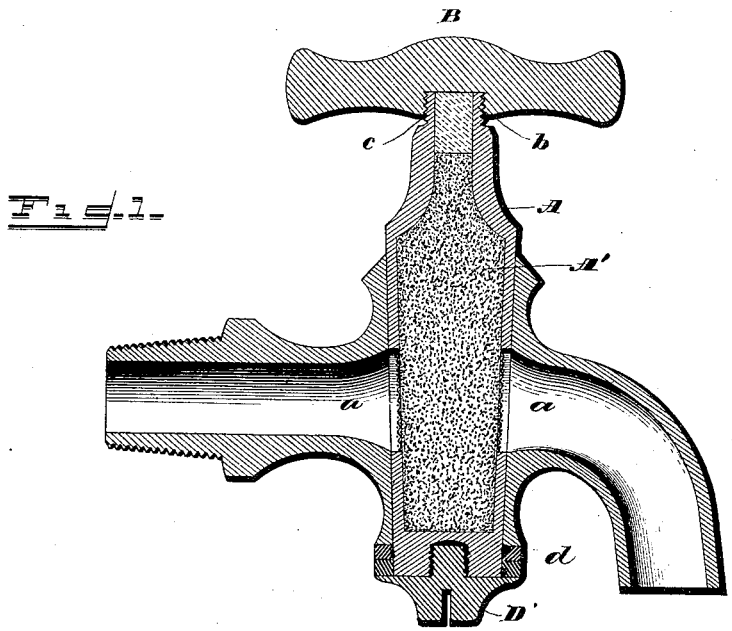
Figure 2:
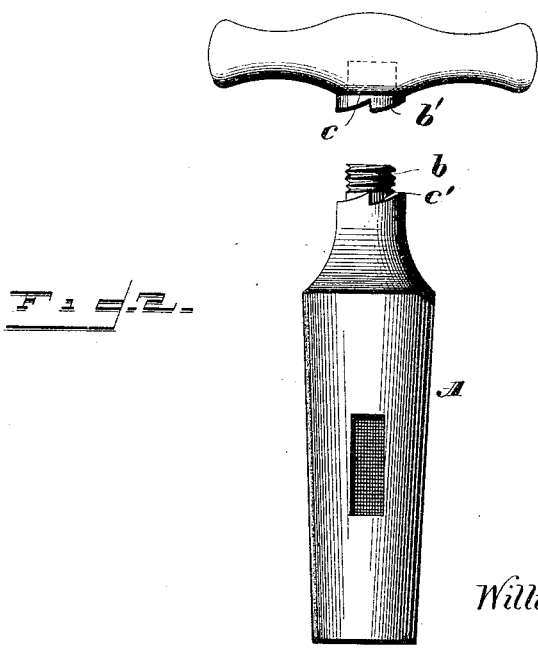

In the accompanying drawings, which illustrate my invention, Figure 1 is a sectional view of a faucet having a turning plug, the same being constructed in accordance with my invention. Fig. 2 is a side view of a faucet-plug with the handle detached, showing a modification of my invention.

In the drawings, A represents the plug, which is cast from brass or other suitable material, so as to have an interior chamber, A', which is adapted to contain the filtering material. This plug is provided with openings a, which are opposite each other, said openings being covered with wire-gauze, which wire-gauze is soldered or otherwise secured over the openings. The lower portion of the faucet-plug is of ordinary construction, while the upper part extends above the body portion of the faucet and is externally screw-threaded.

The faucet-plug is provided with an opening at its top, through which the filtering material may be passed to the interior of the chamber, and this opening is adapted to be closed by an ordinary plug or cork.

The handle B of the faucet-plug is provided with a recess which is internally screw-threaded, the depth of said recess being less than the screw-threaded projecting portion on the faucet-plug, so as to prevent the parts jamming upon each other.

By constructing the screw-threaded portion b of the plug A of greater length than the internally-screw-threaded recess c, which is formed in the handle B, the parts are prevented from jamming or binding when the handle is turned in one direction, as the exterior base of the recess will not come in contact with the shoulder formed in the plug, but will only contact with the upper portion of the recess, so that when the handle is turned in one direction it will carry the plug A with it, and when turned in an opposite direction it will unscrew without turning the plug. By this construction the openings in the plug are reversed every time the plug is turned, so that the impurities will be washed from the filtering-chamber.

If desirable, the handle B may be provided with a clutch, b', and the plug will have a similar clutch, c', formed thereon, which clutches will engage to turn the plug when the handle is turned in the proper direction, and will become disengaged when the handle is turned in an opposite direction, the pitch of the screw-threads being equal to the pitch of the clutch-faces.

The plug A is provided with a chamber, which is of sufficient size to receive a quantity of filtering material sufficient to effectively filter the water in its passage through the chamber.

The bore of the faucet in which the plug fits is of considerably larger diameter than the bore of ordinary faucets, and the bore and plug are preferably tapered, so that the frictional contact of the parts can be adjusted by turning the screw D, which engages with the lower portion of the plug, the head thereof bearing upon a spring, d, which contacts with the faucet adjacent to the lower portion of the bore.

In my prior patent hereinbefore referred to I showed a filtering-faucet having a pawl and ratchet, so as to prevent the rotation of the plug except in one direction; but this construction in practice has been found objectionable, inasmuch as the ratchet-teeth are liable to become filled with foreign material, and the pawl is liable to be thrown accidentally out of engagement, thereby overcoming the objects of such construction. The ratchet in said construction also prevents the plug being properly adjusted when worn, as it will not permit the plug to enter the bore in the body portion of the faucet beyond said ratchet.

In addition to the above objections, the pawl and ratchet is expensive to construct, and when said construction is employed the body portion of the faucets have to be manufactured to receive a specially-constructed plug, whereas with my present improvement the plug may be applied to faucets of ordinary construction and those which are already in place.

I claim—

1. As a new article of manufacture, a filtering-plug for faucets, having an upper screw-threaded portion, and a handle having an internally-screw-threaded recess of less depth than the threaded portion of the plug, substantially as shown, and for the purpose set forth.

2. In combination with a faucet, a turning plug therefor having a central chamber which is adapted to be filled with a filtering material, the upper portion of said plug having an exteriorly-screw-threaded portion which engages with an internal screw-threaded recess in the handle, the depth of said recess being less than the length of the screw-threaded portion on the plug, substantially as shown, and for the purpose set forth.

3. A filtering-faucet having a body portion of ordinary construction, a hollow plug having openings opposite to each other, with gauze coverings, an opening in the upper end of said plug for filling the same, and a stopper for said opening, the upper end of the plug being externally screw-threaded, in combination with a handle for turning the plug in one direction, said handle having a screw-threaded recess of less depth than the threaded portion of the plug, substantially as shown, and for the purpose set forth.

4. As a new article of manufacture, a hollow conical plug for faucets, having openings in its shell opposite each other, the upper portion of the plug having an opening for filling the same with filtering material, the upper end of the plug being screw-threaded, and a handle with an internally screw-threaded recess, whereby the plug can be turned, when placed in the body portion of the faucet, in but one direction by the handle when the parts are organized for use.

In testimony whereof I affix my signature in presence of two witnesses.

WILLIAM H. McDONALD.

Witnesses:
E. W. JOHNSON,
HORACE S. BEALL.